May 16, 1939.  S. M. LLOYD  2,158,630
TESTING APPARATUS
Filed April 7, 1937  2 Sheets-Sheet 1
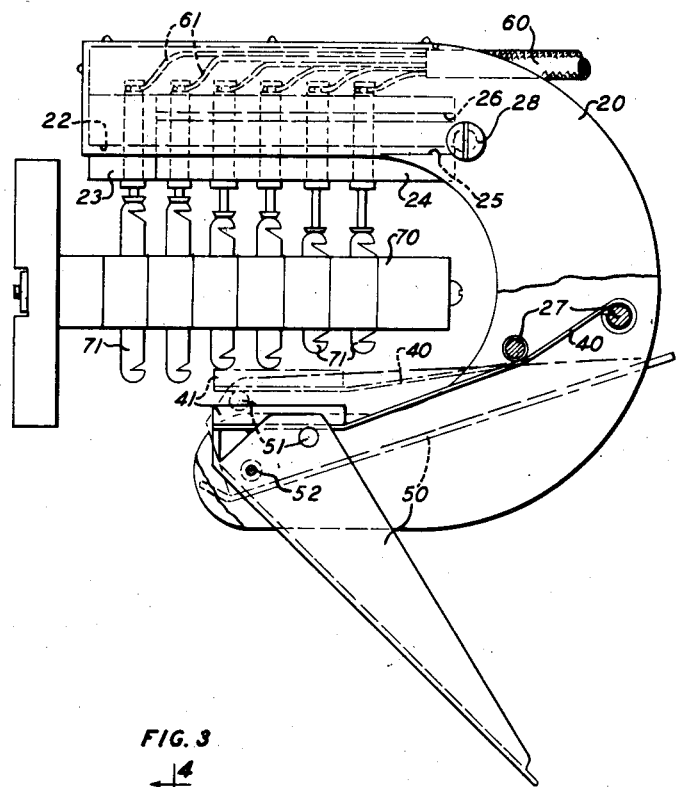
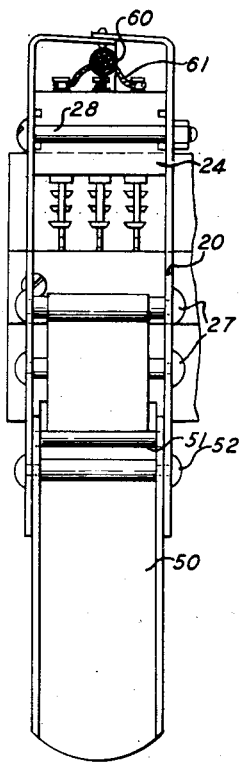
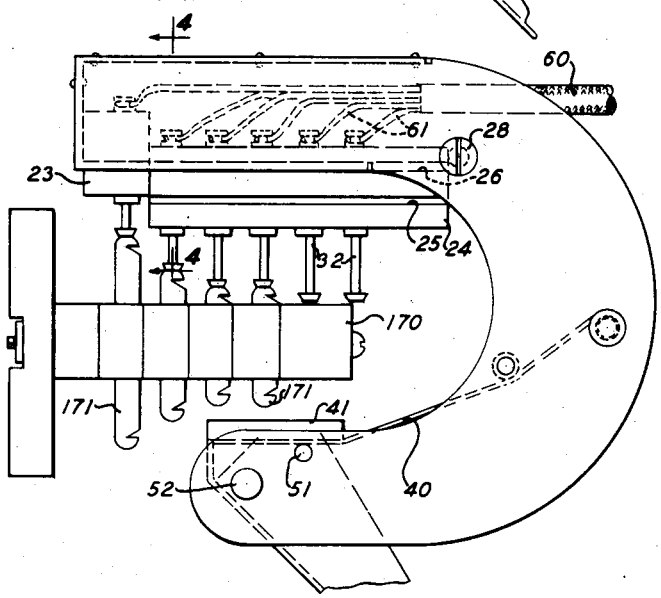
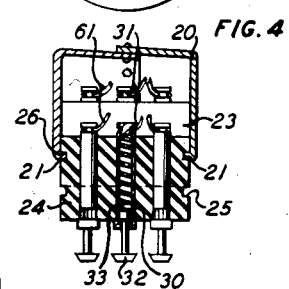
INVENTOR
S. M. LLOYD
BY
E. R. Nowlan
ATTORNEY May 16, 1939.　　　　　S. M. LLOYD　　　　　2,158,630
TESTING APPARATUS
Filed April 7, 1937　　　　2 Sheets-Sheet 2
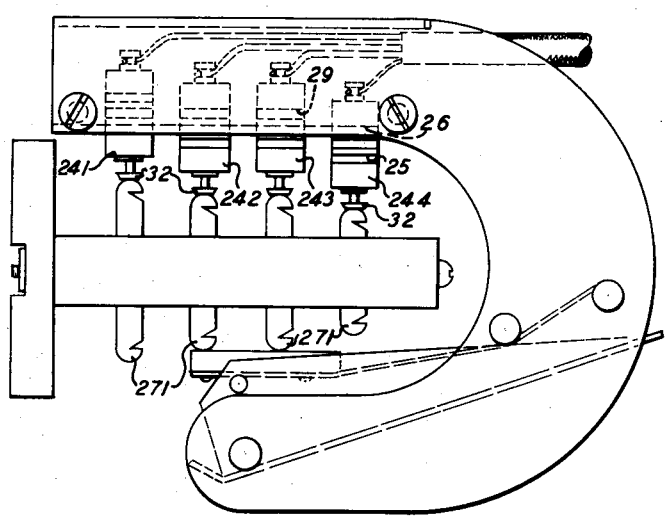
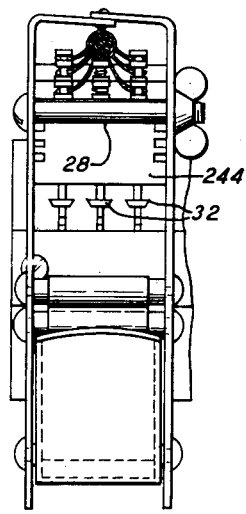
INVENTOR
S. M. LLOYD
BY
E. R. Nowlan
ATTORNEY Patented May 16, 1939

2,158,630

UNITED STATES PATENT OFFICE 2,158,630

TESTING APPARATUS

Stanley M. Lloyd, West Englewood, N. J., assignor to Western Electric Company, Incorporated, New York, N. Y., a corporation of New York Application April 7, 1937, Serial No. 135,424

7 Claims. (Cl. 173—324)

This invention relates to testing apparatus, and more particularly to a contact fixture for testing at one setting a plurality of circuits attached to terminals held in rigid groups in blocks in telephone central apparatus.

In the construction of telephone switchboards and the like, in some cases, a multiplicity of electrical circuits is individually connected to the members of a corresponding plurality of rigid metal terminal members held in an aligned array of rows and files in one or more rigidly mounted blocks of insulating material. It may become necessary, during construction or subsequently in use, to test electrically the several circuits connected to the various terminals.

An object of the present invention is to provide a simple, effective and convenient device for simultaneously establishing electrical contact temporarily between the several conductors of a multi-conductor electrical cable (or other fixed plurality of conductors) and the several terminal members of a predetermined number of rows and files of such mounted in a block.

One embodiment of the invention presents a C-shaped frame adapted to receive a terminal block between its jaws, having a plurality of suitably arrayed contact members individually yieldably mounted in one jaw and means mounted in the other jaw to press the first jaw toward the block and to clamp it thereon, the member by which the plurality of contact members is mounted in the frame being adjustable in the frame either as a whole or in portions, to vary the capacity of the device as to the absolute and also the relative lengths of the array of terminals to be received for test.

Other objects and features of the invention will appear from the following detailed description of one embodiment thereof taken in connection with the accompanying drawings in which like reference numerals are applied to identical parts and in which Fig. 1 is a broken side view of a testing fixture constructed in accordance with the invention and applied to a terminal block;

Fig. 2 is a corresponding end view thereof with the clamp lever down;

Fig. 3 is a view corresponding to Fig. 1 showing the fixture adjusted for and applied to a different array of terminals;

Fig. 4 is a section on the line 4—4 of Fig. 3;

Fig. 5 is a view corresponding to Fig. 1 of a modified form, and

Fig. 6 is a view corresponding to Fig. 2 of the modified form.

In the embodiment of the invention disclosed in Figs. 1 to 4 inclusive, the testing device comprises a generally C-shaped body 20 of sheet metal, formed with similar, parallel side walls. The bottom edges of the side walls in the upper arm of the C are turned in to form supporting flanges 21. A short fixed block 23 of insulating material is mounted on these flanges, within the extreme outer end of the upper arm, by means of corresponding grooves or slots 22 formed in each side of the block. A longer block 24 of insulating material also located between the side walls of the arm of the body 20 may be supported therein in alignment with the block 23 by the flanges 21 entering corresponding grooves or slots 25 in the block 24 as shown in Fig. 1, or the block 24 may be supported in another lower position in the body 20, as shown in Figs. 3 and 4, if the flanges 21 are entered into a second pair of grooves 26 in the block 24.

A plurality of metal sleeves 30 is permanently mounted in the blocks 23 and 24. Each of these is closed at its top end and there formed with a circumferential slot 31 for ready attachment of an electrical conductor strand. A vertically slidable contact member 32 is slidably mounted in each sleeve 30 together with a compression spring 33 to keep the contact member pressed yieldingly down.

In the lower arm of the C between the walls of the body 20 is positioned a leaf spring 40, one end resting against transverse bolts or rivets 27 which also serve to space the side walls of the body 20 apart as well as to hold them together. The other end of the spring 40 is positioned in the outer extremity of the lower arm of the C about opposite and parallel to the middle part of the block 24, and carries a pressure block 41. The under side of this end of the spring 40 is supported on a cross pin 51 mounted in a lever 50 pivoted at 52 in the lower arm of the C.

In use, a multi-conductor cable 60 has its several conductors secured to the several terminals 31 and is connected to an appropriate electrical testing circuit not shown.

In certain kinds of telephone apparatus there will be found projecting ledges of insulating material, such as indicated at 70 in Fig. 1 and at 170 in Fig. 3, in which are transversely mounted metal terminal or connector members 71 and 171 arranged in regular rows and tiers. Thus in Figs. 1 and 2 is shown an illustrative structure having six rows and three tiers, and in Figs. 3 and 4 another having four rows and three tiers. In these two illustrations the spacings of the rows and tiers are uniform and the same in Fig. 3 as in Fig. 1. Generally speaking there is a standard uniform spacing, adopted from experience, regardless of the number of rows or tiers.

The treminals 71 or 171 of any one array of such, are usually of varying length for convenience in assembly, but are alike in general form and structure. As here shown each is a stamping of sheet metal passing transversely through the block 70 or 170 and notched at either end to have an electrical conductor strand (not shown) attached thereto. Generally, the shortest of these members 71 or 171 in any given array will be located nearest the outer edge of the member 70 or 170, and the longest farthest from that edge.

The C shaped body 20 and its related parts are so dimensioned and arrayed that, as shown in Fig. 1, when the lever 50 is down, an array of terminals 71 may be slid into position in the recess of the C between the array of contacts 32 above and the pressure block 41 below, and that when the lever 50 is then raised the array of terminals 71 will be clamped between the contacts 32 above and the block 41 below, thus supporting the whole device in position on the terminals and connecting each terminal 71 individually through a corresponding contact 32 with one of the conductor strands 61.

In the case of an array of terminals 171, which tapers more abruptly and also may have fewer rows than the array 71, by removing the bolt 28 the block 24 may be withdrawn from the position shown in Fig. 1 and replaced in the position shown in Fig. 3.

A further development of this adjustability of the array of contacts 32 is shown in the modified form disclosed in Fig. 5 where the block 23 is omitted and four mutually independent blocks 241, 242, 243 and 244 are substituted for the single integral block 24. Each of these blocks may be provided with one or more slots 29 in addition to slots 25 and 26. Also the total length of the four blocks together may be less than the length of the block 24. The four blocks are then individually adjustable independently of each other for abnormal spacing of the rows of the array of terminals 271 as well as for variations in height of these terminals.

The embodiments of the invention herein disclosed are illustrative only and may be modified and departed from in many ways without departing from the spirit and scope of the invention as pointed out in and limited solely by the appended claims.

What is claimed is:

1. A contact fixture for making individual contact with each of a plurality of terminals arranged in fixed orderly array, the said fixture comprising a body having a recess therein, a plurality of supporting members mounted in the body at one side of the recess, means to mount one of the supporting members in the body in either of two positions to extend more or less deeply into the recess, an orderly array of contact members mounted in the plurality of supporting members and extending into the recess, and means on the opposite side of the recess to clamp an array of terminals between the array of contact members and the said clamping means, each terminal being then in contact with one and only one contact member.

2. A contact fixture for making individual contact with each of a plurality of terminals arranged in fixed orderly array, the said fixture comprising a body having a recess therein, a plurality of supporting members mounted in the body at one side of the recess, means for each supporting member to mount the same independently of the other supporting members in either of two positions to extend more or less deeply into the recess, an orderly array of contact members mounted in the plurality of supporting members and extending into the recess, and means on the opposite side of the recess to clamp an array of terminals between the array of contact members and the said clamping means, each terminal being then in contact with one and only one contact member.

3. A contact fixture for making individual contact with each of a plurality of terminals arranged in fixed orderly array, the said fixture comprising a C-shaped body defining a recess between the arms of the C and having a slot in one arm of the C at one side of the recess, an inwardly extending flange on each of the parallel opposite walls of the slot, a block of insulating material positioned in the slot and formed on each of two opposite surfaces with two grooves to receive the flanges and thereby to hold the block in either of two positions in the slot to extend more or less deeply into the recess of the body, a plurality of contact members mounted in orderly array in the block and extending into the recess, and an adjustable clamp member mounted in the other arm of the C at the other side of the recess to clamp an array of terminals between the array of contact members and the said clamp member, each terminal being then in contact with one and only one contact member.

4. A contact fixture for making individual contact with each of a plurality of terminals arranged in fixed orderly array, the said fixture comprising a C-shaped body defining a recess between the arms of the C and having a slot in one arm of the C at one side of the recess, an inwardly extending flange on each of the parallel opposite walls of the slot, a plurality of blocks of insulating material positioned in the slot and each block formed on each of two opposite surfaces with two grooves to receive the flanges and thereby to hold the block in either of two positions in the slot to extend more or less deeply into the recess of the body, a plurality of contact members mounted in orderly array in the blocks and extending into the recess, and an adjustable clamp mounted in the other arm of the C at the other side of the recess to clamp an array of terminals between the array of contact members and the said clamp member, each terminal being then in contact with one and only one contact member.

5. A contact fixture for making individual contact with each of a plurality of terminals arranged in fixed orderly array, the said fixture comprising a body having a recess therein, a plurality of supporting members mounted in the body at one side of the recess, each of the supporting members being independently adjustable to extend more or less deeply into the recess and laterally with respect to the other supporting members, an orderly array of contact members mounted in the plurality of supporting members and extending into the recess, and means on the opposite side of the recess to clamp an array of terminals between the array of contact members and the said clamping means, each terminal being then in contact with one and only one contact member.

6. A contact fixture for making individual contact with each of a plurality of terminals arranged in fixed orderly array, the said fixture comprising a C-shaped body defining a recess between the arms of the C and having a slot in one arm of the C at one side of the recess, a plurality of blocks of insulating material mounted in the slot and adjustable independently of each other laterally toward and from each other, a plurality of contact members mounted in orderly array in the blocks and extending into the recess, and an adjustable clamp member mounted in the other arm of the C at the other side of the recess to clamp an array of terminals between the array of contact members and the said clamp member, each terminal being then in contact with one and only one contact member.

7. A contact fixture for making individual contact with each of a plurality of terminals arranged in fixed orderly array, the said fixture comprising a C-shaped body defining a recess between the arms of the C and having a slot in one arm of the C at one side of the recess, a plurality of blocks of insulating material mounted in the slot and adjustable independently of each other both toward and from the other arm of the C and also laterally toward and from each other, a plurality of contact members mounted in orderly array in the blocks and extending into the recess, and an adjustable clamp member mounted in the other arm of the C at the other side of the recess to clamp an array of terminals between the array of contact members and the said clamp member, each terminal being then in contact with one and only one contact member.

STANLEY M. LLOYD.